United States Patent [19]
Tamaki et al.

[11] Patent Number: 5,710,597
[45] Date of Patent: Jan. 20, 1998

[54] METHOD OF SAVING POWER FOR VIDEO CAMERA

[75] Inventors: Kenji Tamaki; Koichi Yahagi, both of Asaka, Japan

[73] Assignee: Fuji Photo Film Co., Ltd., Kanagawa, Japan

[21] Appl. No.: 557,897

[22] Filed: Nov. 14, 1995

Related U.S. Application Data

[63] Continuation of Ser. No. 216,938, Mar. 24, 1994, abandoned.

[30] Foreign Application Priority Data

Mar. 31, 1993 [JP] Japan ................................. 5-074270

[51] Int. Cl.$^6$ ............................................. H04N 5/225
[52] U.S. Cl. ........................................ 348/372; 358/906
[58] Field of Search ........................ 348/207, 222, 348/372, 373, 374, 375, 376, 220, 341; 358/312, 906, 909.1; 360/10.1, 55, 69, 39; 386/46, 68, 107, 117, 1; H04N 5/225

[56] References Cited

U.S. PATENT DOCUMENTS

| | | | |
|---|---|---|---|
| 4,161,002 | 7/1979 | Saito | 360/75 |
| 4,700,255 | 10/1987 | Mitsuhashi | 360/74.1 |
| 4,750,056 | 6/1988 | Ogawa | 360/35.1 |
| 4,945,424 | 7/1990 | Hiroki | 358/335 |
| 5,060,069 | 10/1991 | Aoki | 358/209 |
| 5,063,458 | 11/1991 | Fukushima et al. | 358/335 |
| 5,142,379 | 8/1992 | Jung et al. | 358/335 |
| 5,313,305 | 5/1994 | Harigaya et al. | 348/214 |
| 5,412,425 | 5/1995 | Nagano | 348/372 |

*Primary Examiner*—Andrew Faile
*Assistant Examiner*—Ngoc-Yen Vu

[57] ABSTRACT

A video camera having a taking lens of multiple focal lengths is provided with a separate, multiple focal length view finder lens. When power has been supplied to the camera via the "on" switch but a switch for video recording has not yet been closed, the focal length of the view finder is automatically made to coincide with the focal length of the taking lens so as permit the scene to be viewed in the same frame size as it will appear when recording, but without wasting power by supplying power to those circuits of the taking lens that form electrical signals of the scene or that record the scene. In addition, in a preferred embodiment of the invention, six different power level consumption states are provided so as to supply power only to the minimum circuitry required for each state.

8 Claims, 3 Drawing Sheets

METHOD OF SAVING POWER FOR VIDEO CAMERA

This application is a continuation of application U.S. Ser. No. 08/216,938 filed on Mar. 24, 1994, now abandoned.

BACKGROUND OF THE INVENTION

1. Field of the Invention

The present invention relates to a method of saving power for a video camera, more particularly it relates to a method of saving power for a video camera wherein power consumption can be reduced during standby for picture recording.

2. Description of the Related Art

Generally, when a video camera is used for recording a power switch is turned on to achieve a standby condition. Then a recording start/stop button is depressed to start picture recording.

In order to start picture recording immediately in response to the operation of the recording start/stop button, the video camera is put in standby after turning on the power. Thus, when in standby mode, power is supplied to almost all the circuits of the camera block, the VTR block and the system control block.

As a result, if standby mode for picture recording continues for a long time, there is a disadvantage in that the actual time for recording becomes much shorter than the expected picture recording time because the battery becomes discharged.

SUMMARY OF THE INVENTION

The present invention has been developed to eliminate the above-described disadvantage and has as its aim the provision of a method of saving power for a video camera, so that power consumption can be reduced in the state of standby for picture recording.

To achieve the above-described object, a method of saving power for a video camera is characterized in that power to a circuit for generating image signals in a camera block is cut off in the state of standby for picture recording.

Moreover, it is also characterized in that power to a signal processing circuit for generating recording signals in a VTR block is cut off in the state of standby for picture recording.

According to this invention, a video camera is provided with an optical view finder. A finder image can thus be obtained while in the state of standby for picture recording without generating video signals, which are needed in the conventional electronic view finder.

BRIEF DESCRIPTION OF THE DRAWINGS

The exact nature of this invention, as well as other aims and advantages thereof, will be readily apparent from consideration of the following specification relating to the accompanied drawings, in which like reference characters designate the same or similar parts throughout the figures thereof and wherein.

DESCRIPTION OF THE PREFERRED EMBODIMENT

A detailed description will hereafter be given of the preferred embodiment of the method of saving power in a video camera according to the present invention with reference to the accompanying drawings.

Figure 1:
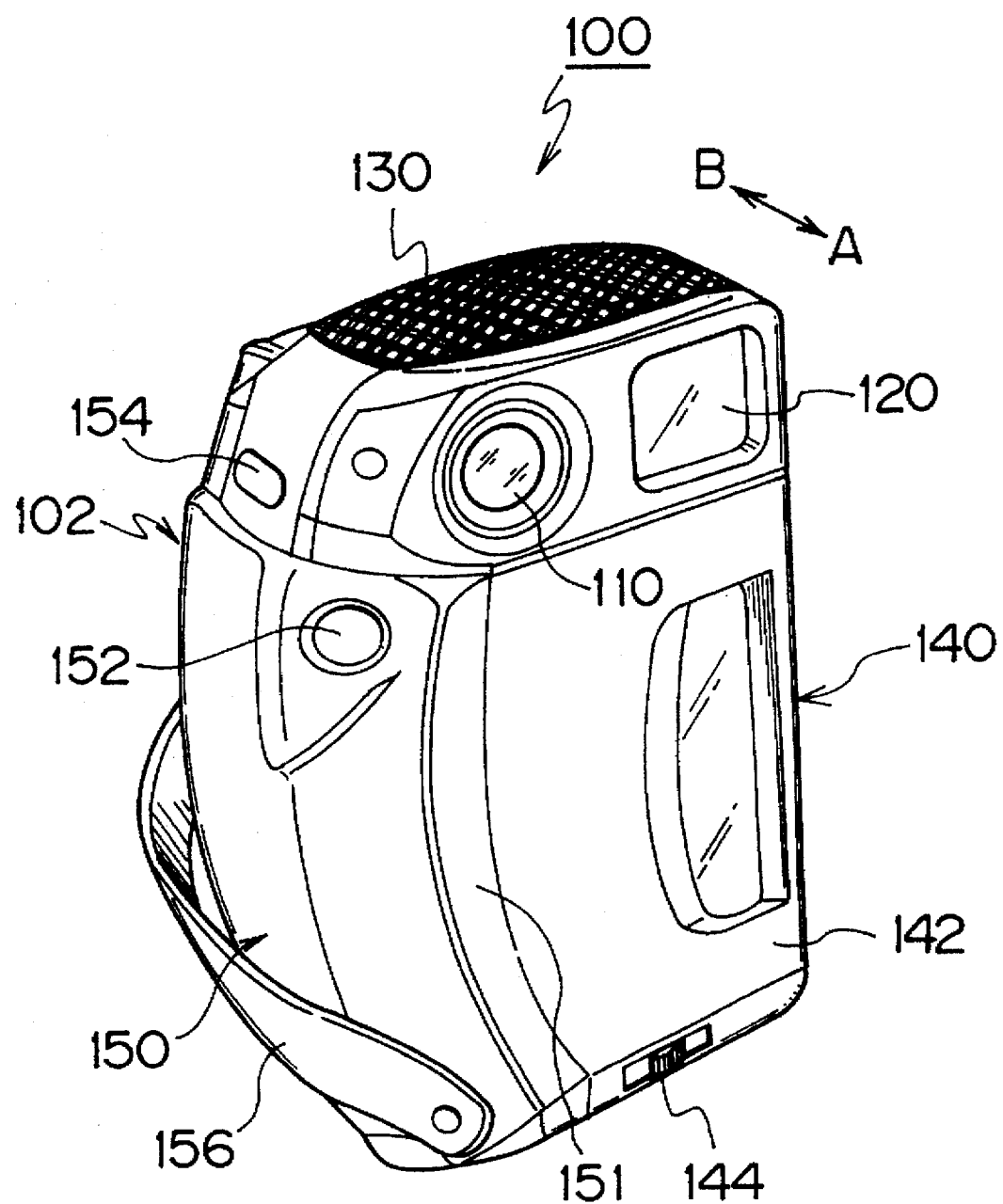
FIG. 1 is a perspective view showing one embodiment of a video camera employing the method of saving power for a video camera according to the present invention.

FIG. 1 is a perspective view showing one embodiment of a video camera applied to a method of saving power in a video camera according to the present invention.

As shown in FIG. 1, a video camera 100 has an outer shape of a relatively flat rectangular parallelepiped which is short in the direction of the photographing (the direction indicated by an arrow AB in FIG. 1). A taking lens 110 and an optical view finder 120 are provided on the upper portion of the camera, and a stereo microphone 130 is positioned on the top thereof. Designated at 140 is a tape deck, 150 a side grip, 152 a taking button and 154 a tele/wide angle switching button.

The taking lens 110 is a double-focal length lens capable of being changed from a focal distance of a wide angle taking to a focal distance of a telescopic taking (a range of about 2× zooming) and vice versa, and whenever the tele/wide angle switching button 154 is pushed once, the focal distance is changed. Also, this taking lens 110 has a large depth of field, whereby the lens is designed to be able to focus from the nearest point to infinity for either of the focal distances. Furthermore, the time required for tele/wide angle switching of the taking lens 110 is about 0.2 sec.

The optional view finder 120 is constructed in such a way that the view field is switched automatically by switching the taking lens 110 from one focal distance to the other using tele/wide angle switching button 154. Thus the view field coincides with the field of the taking lens. Also, this automatic control of the optical view finder 120, during picture recording, can be switched off for independent control of the view field by the user.

The tape deck 140 includes a rotary head drum, a tape loading mechanism, a tape delivery mechanism and the like, not shown, and magnetically records and reproduces video signals showing the subject taken by the taking lens 110 and audio signals detected by the stereo microphone 130 to a video tape of the 8 mm cassette. Also, designated by 142 is a lid which is opened or closed at the time of inserting or taking out the cassette, and a cassette eject button 144.

A side grip 150 is formed to provide a curve, and a portion 151 where fingers can be placed is so formed on the front surface of the camera. A taking button 152 is provided at the front surface of the camera and operated by the forefinger of the right hand holding the side grip portion 150. Furthermore, the tele/wide angle switching button 154 is also provided at a position where the button 154 is operable by the forefinger of the right hand. Designated at 156 is a grip belt.

Next, a description will be given of the internal structure of the above-described video camera 100.

Figure 2:
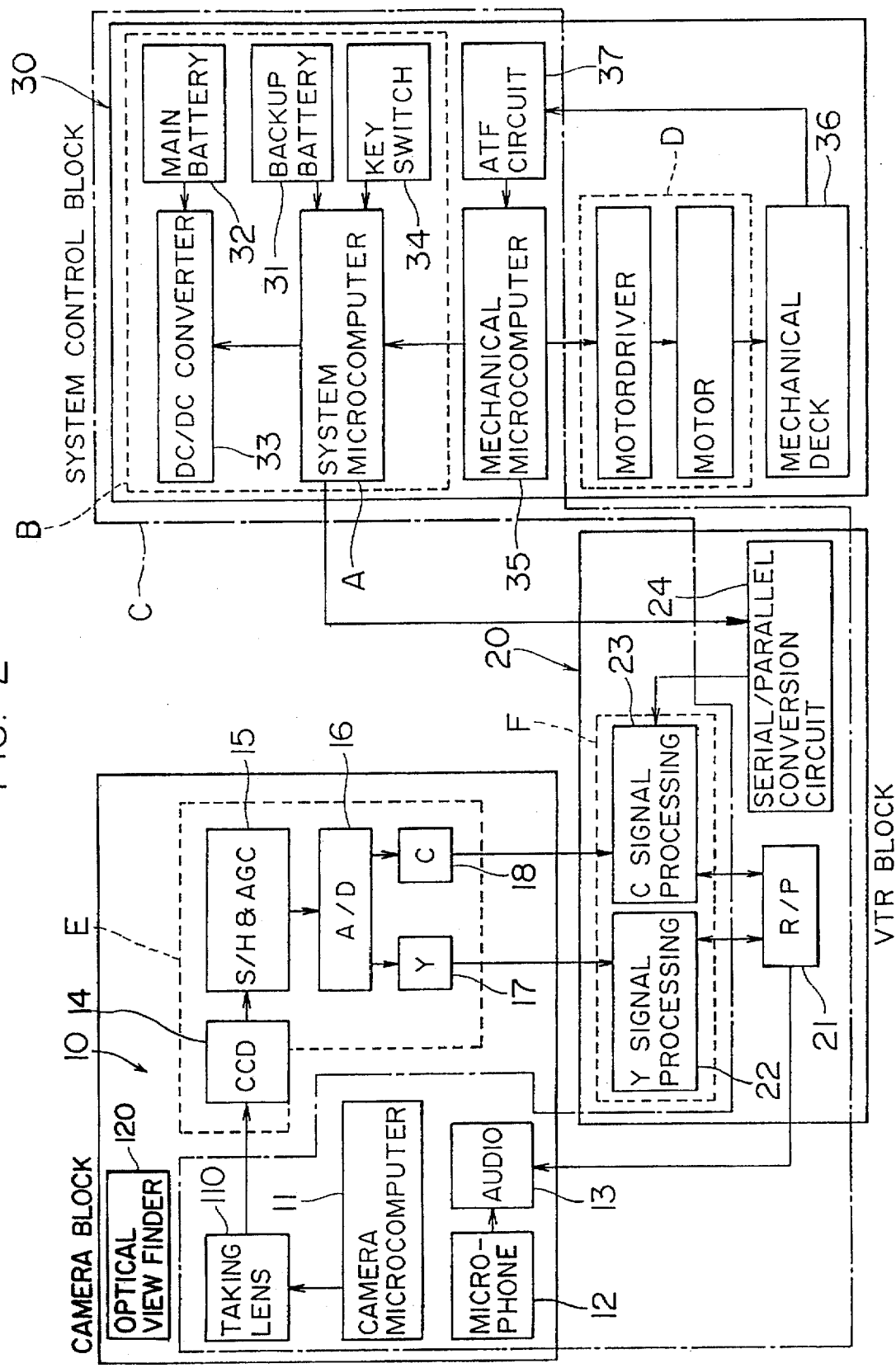
FIG. 2 is a block diagram showing the internal structure of the video camera as shown in FIG. 1.

As shown in FIG. 2, the video camera 100 consists of a camera block 10, a VTR block 20, and a system control block 30.

The camera block 10 includes a taking lens 110, and further includes a camera microcomputer 11, a microphone 12, an audio circuit 13 and a circuit or generating video signals (circuits surrounded by a broken line E). The circuits surrounded by the broken line E consist of a charge-coupled device (CCD) 14, a sample hold circuit, an AGC circuit, an A/D conversion circuit 16, a white balance circuit, a γ correction circuit, an encoder circuit and the like, and in addition, signal processing circuits 17, 18 in which digital signals received from the A/D conversion circuit 16 are processed and output as luminance signals (Y signals) and chromatic signals (C signals).

The VTR block 20 includes a record/reproduction amplifier 21, a Y signal processing circuit 22 and a C signal processing circuit 23 (in which recording signals which are suitable for magnetic recording are generated from Y signals and C signals received from the camera block 10 and the signals from the record/reproduction amplifier 21 are converted to video signals), and a serial/parallel conversion circuit 24. Serial data are transferred between the VTR block 20 and a system microcomputer A in a system control block 30, and the received serial data are converted into parallel data in the serial/parallel conversion circuit 24 and output to the respective parts in the VTR block 20. That is; most of the control signal exchanges between the VTR block 20 and the system control block 30 are performed by this serial data transfer; therefore, the connection between the VTR block 20 and the system control block 30 can be simplified, and the number of wireharnesses and connectors can be reduced.

The system control block 30 includes the system microcomputer A, a backup battery 31, a main battery 32, a DC/DC convertor 33, a key switch 34, a mechanical microcomputer 35, various motors with their drivers D.?? These motors include a drum motor, a loading motor, and a capstan motor. Control block 30 also includes a mechanical deck 36, and an ATF circuit 37. The ATF circuit 37 detects a track difference between a rotational head and a recording truck for servo control of the capsan motor.

Next, a detailed description will be given of the method of saving power for a video camera according to the present invention with reference to the timing chart shown in FIG. 3.

Figure 3:
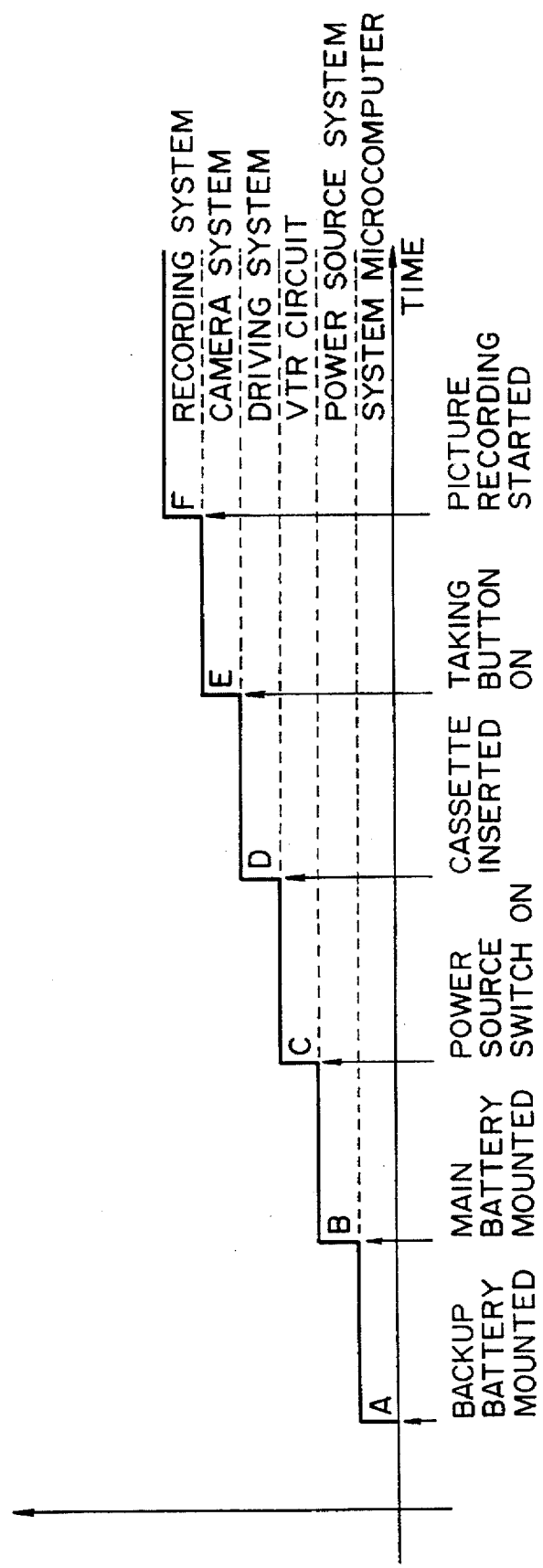
FIG. 3 is a sequencing chart showing the method of saving power for a video camera according to the present invention.

As shown in FIG. 3, first, when he backup battery 31 is mounted, only the system microcomputer A is supplied with a power. The current consumption in this case is about 8 A. Next, when the main battery 32 is mounted, the DC/DC convertor 33 is additionally supplied with power so that the circuits surrounded by the broken line B in FIG. 2) are supplied with power. The current consumption in this case is about 1.5 mA.

Next, when the power source switch is turned on without the cassette being loaded, power is additionally supplied to the items in the area surrounded by the dotted line B, and to those portions of camera block 10 and VTR block 20 surrounded by the one-chain line C. These additional items are: the taking lens circuit 110, the camera microcomputer 11, the microphone 12, the audio circuit 13, the record/reproduce circuit 21 and the serial/parallel conversion circuit 24). Also, in this state, the focal length of the taking lens 110 can only be switched between tele/wide angle and vice-versa by the operation of the tele/wide angle switching button 154. Thus, the two focal distances are switched over whenever the tele/wide angle switching button 154 is pushed and the size of the view field of the optical view finder 120 is switched in an interlocking manner with the tele/wide angle switching of the taking lens 110. However, power is not yet supplied to the iris (not shown) of the taking lens 110. In the VTR block 20, power is supplied to the record/reproduction amplifier 21 and the serial/parallel conversion circuit 24, but not to other circuits (the Y signal processing circuit 22 an the C signal processing circuit 23). Consumption of current in this state is about 200 mA.

On the other hand, assuming the power source switch is on when the cassette is mounted, the video camera then assumes a standby state for picture recording. This is, upon the shift to the state of standby for picture recording, first, the system control block 30 drives the drum motor, the loading motor an the capstan motor in the driving system D based on the control signals from the mechanical microcomputer 35. Next, when these come to their respective predetermined positions, the loading motor and the capstan motor are stopped and only the drum motor is kept in the driving state. In this way, the picture recording comes to a state of standby. The consumption of current in the state of standby for picture recording is about 300 mA.

When the taking button 152 is pushed while in the state of standby for picture recording, the power is supplied to the entire camera block 10, thereby first energizing CCD 14, a sample and hold circuit, an AGC circuit 15, an A/D conversion circuit 16, a white balance circuit, a γ correction circuit, an encoder circuit, and signal processing circuits 17 an 18. In addition, power is applied to signal processing circuits 22, 23 in the VTR block 20 and to the iris of the taking lens 110. Finally, the capstan motor is driven so as to start tape recording. The current consumption in the picture recording is about 700 mA.

Moreover, when the taking button is pushed for the picture recording a second time, the state is returned to standby for picture recording.

As has been described already, in the method of saving power for a video camera, the power to circuits of the camera block, in which video signals are generated, is cut off while in the state of standby for picture recording, therefore, the power consumption in the state of standby for picture recording can be reduced. Further, power to the signal processing circuits of the VTR block, in which recording signals are generated, is also cut off, so that the power consumption can be reduced still more.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A power saving method for a video camera having an optical view finder, a drum motor, a loading motor, a capstan motor, a power switch, a rotary head drum, loading means for loading a video tape, a circuit for generating image signals, and a signal processing circuit for generating recording signals to be recorded on the video tape based upon the image signals, the method comprising the steps of:

starting the drum motor, the loading motor, and the capstan motor when the video tape is mounted and the power switch is turned on, the drum motor driving the rotary head drum, the loading motor driving the loading means, and the capstan motor being used for delivering the video tape at a fixed speed;

setting a stand-by state for picture recording when a rotational speed of the rotary head drum reaches a predetermined speed and the video tape is located in a predetermined position, the loading motor and the capstan motor being stopped and only the drum motor being driven during the stand-by state;

setting a recording state when a user instructs to start picture recording from the stand-by state, the circuit for generating image signals being supplied with electric power and the capstan motor being driven so as to record the image signals onto the video tape during the recording state;

resetting the stand-by state when the user instructs to stop picture recording, the circuit for generating image signals not being supplied with electric power and the capstan motor being stopped during the stand-by state; and supplying power to the circuit for generating image signals when picture recording is instructed and, subsequently, power is then supplied to the signal processing circuit for generating recording signals.

2. The power saving method of claim 1, wherein power to the signal processing circuit is cut off during the standby state.

3. The power saving method of claim 1, wherein the image signals recorded during the recording state represent continuous moving pictures.

4. A method of saving power while operating a video camera having a taking lens, a circuit for detecting an image formed by the taking lens, and a circuit for recording a detected image, said method comprising the steps of:

when power is being supplied to the video camera in a video recording standby mode but video recording has not yet been commanded, not supplying power to the circuit for detecting the image formed by the taking lens and not supplying power to the circuit for recording a detected image; and when video recording is commanded, supplying power to the circuit for detecting the image formed by the taking lens and, subsequently, supplying power to the circuit for recording the detected image.

5. The power saving method of claim 4, wherein the video camera further has an optical view finder, the taking lens and the optical view finder each having multiple focal lengths, and the optical view finder is controlled while in the video recording standby mode as well as when video recording is commanded so as to have its focal length be the same as that of the taking lens.

6. The power saving method of claim 4, wherein the video camera further has an electronic iris operatively associated with the taking lens, the method further comprising the step of not supplying the electronic iris with power during the video recording standby mode.

7. The power saving method of claim 6, further comprising the step of supplying power to the electronic iris when video recording is commanded.

8. The power saving method of claim 4, wherein the video recording includes taking continuous moving pictures.

\* \* \* \* \*